Oct. 5, 1937.                T. BROWN                2,094,871
                              TRACTOR
                         Filed Jan. 23, 1936            3 Sheets-Sheet 2
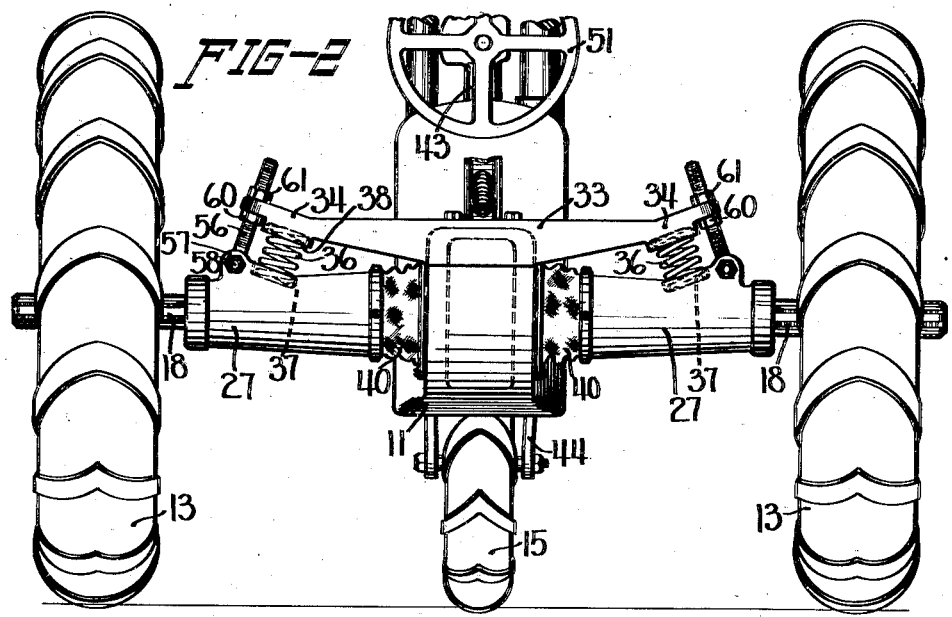
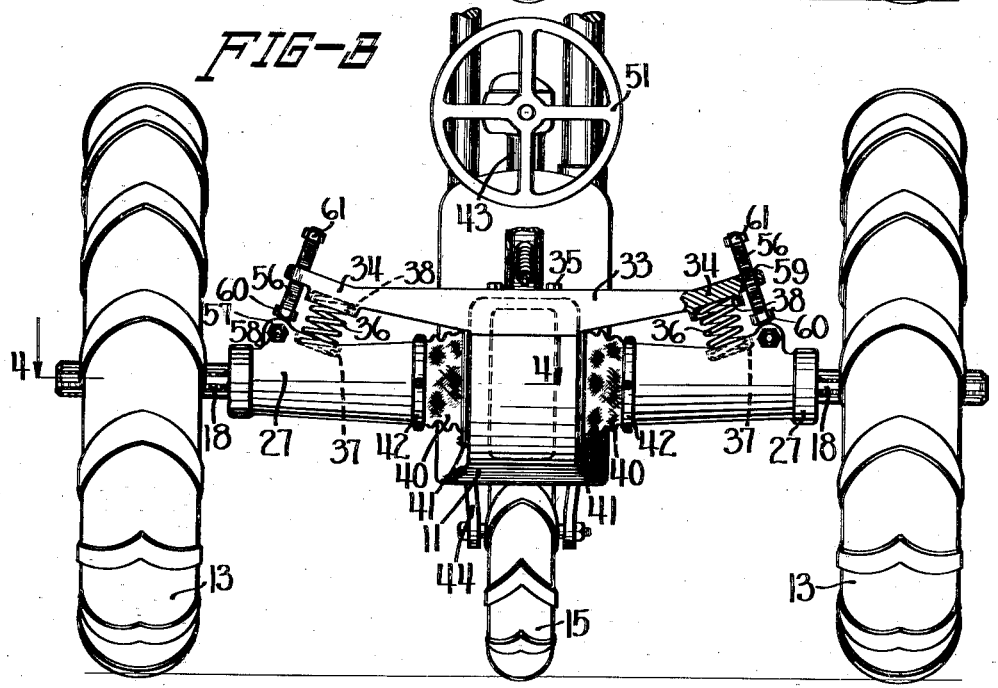
INVENTOR
THEOPHILUS BROWN
BY Stanley Hawks
ATTORNEY

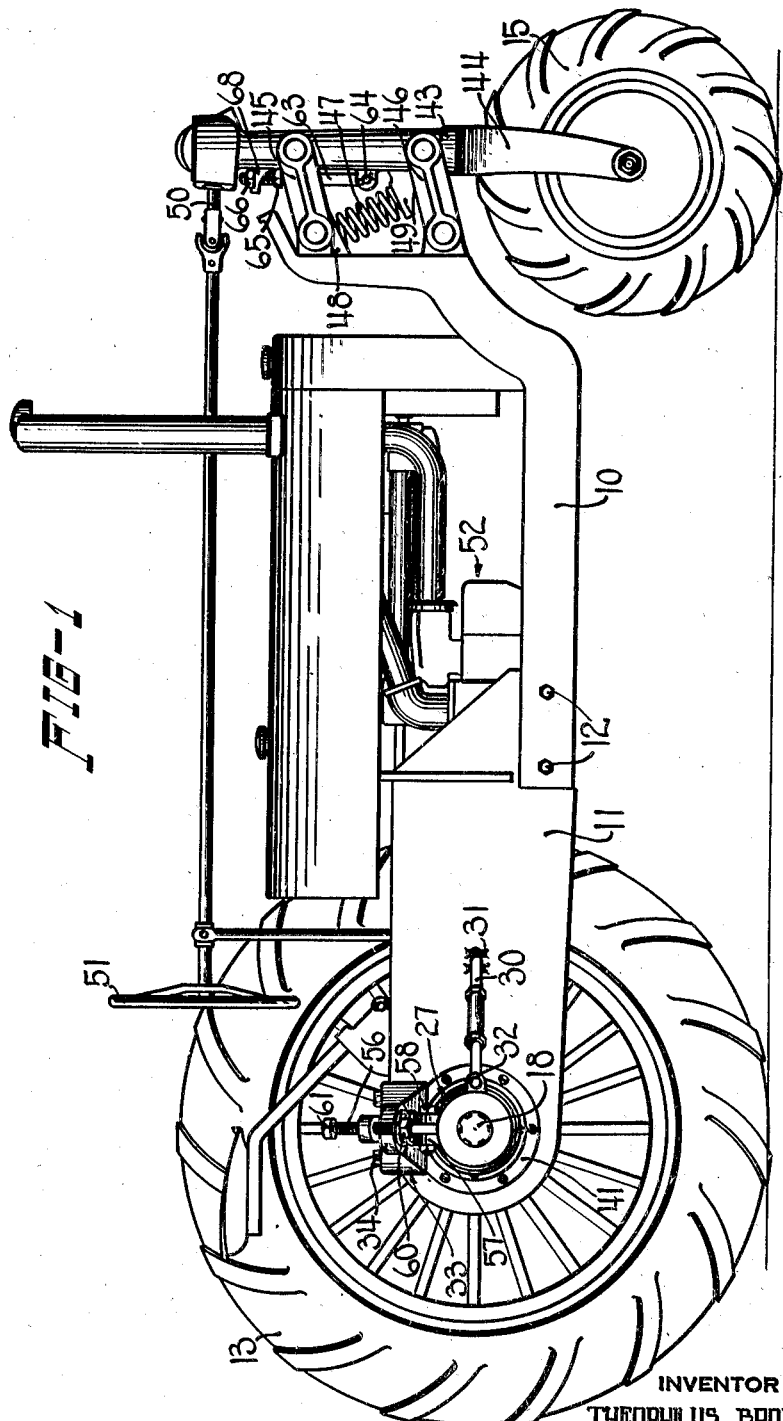

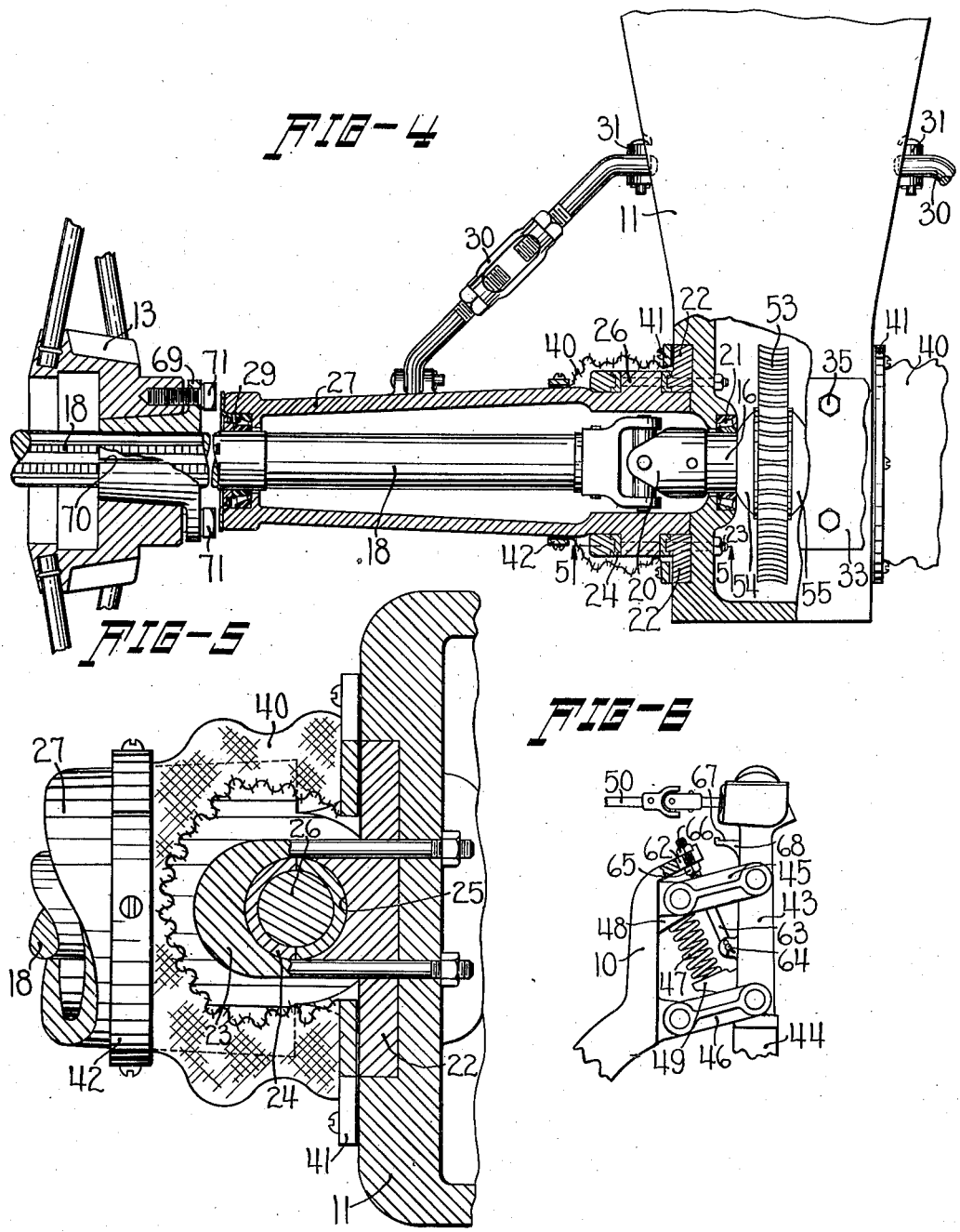

Patented Oct. 5, 1937

2,094,871

UNITED STATES PATENT OFFICE 2,094,871

TRACTOR

Theophilus Brown, Moline, Ill., assignor to Deere & Company, Moline, Ill., a corporation of Illinois Application January 23, 1936, Serial No. 60,440

7 Claims. (Cl. 180—73)

This invention relates to tractors.

While at the present time the primary use of tractors is for pulling farm implements in the field at relatively slow speeds, the use of tractors for hauling products to market has become quite common since the coming of the hard roads and the introduction of pneumatic tires for tractors. To adapt the tractor for the latter use, tractor manufacturers in recent years have provided extra high speeds in the transmission so that the tractor may be operated at speeds of fifteen miles per hour and faster.

The conventional tractor is not adapted for speeds within this range primarily because the tractor body is more or less rigidly supported on its wheels and is not spring supported such as is an automobile, for example. Heretofore it has been thought impractical to spring mount a tractor for the reason that a yieldable mounting would make the tractor unsuitable for heavy duty field work, especially plowing, which is the main purpose to which tractors are put. When a plow is connected to a tractor, especially if the plow be of the type not wholly supported on its own wheels, the distance above the ground of the point at which the plow is connected to the tractor is important in that it affects the depth at which the plow operates. If the tractor body were spring suspended, and the load on the plow increased somewhat, the tractor body under the influence of the increased load imposed upon it would lower. This would lower the point of connection of the plow with the tractor, and tend to cause the plow to operate deeper. This would increase the additional load already imposed upon the tractor and cause further lowering of the tractor body. Inasmuch as it is very desirable to plow at a uniform depth, the above action would be objectionable, if indeed it would not finally result in stalling the tractor.

By my invention I have provided a spring supported tractor with means for eliminating the difficulty outlined above by providing means for locking the tractor-supporting springs out of operation at will so that whenever the tractor is to be used for drawing implements in the field it may be converted into a conventional tractor with the body of the tractor non-yieldingly supported on its wheels. Accordingly the object of my invention is to provide a spring supported tractor with means for locking the springs out of operation at will.

A preferred embodiment of my invention is described in the following specification and illustrated in the accompanying drawings in which—

Figure 1 is a side view of a tractor embodying the present invention with parts thereof removed to better illustrate the rear axle mounting;

Figure 2 is a rear elevational view, partly in section, showing the rear axle mounting in rigid relation to the tractor body;

Figure 3 is a similar view except to show the rear axle mounting in yieldable relation to the tractor body;

Figure 4 is an enlarged section taken on line 4—4 of Figure 3 through the rear axle housing;

Figure 5 is an enlarged section taken on the line 5—5 of Figure 4; and,

Figure 6 is a fragmentary view of the front wheel mounting when in rigid relation to the tractor body.

The body of the tractor illustrated comprises a frame consisting of two main castings 10 and 11, joined as at 12 by bolts. The frame is supported on a pair of rear drive wheels 13 and a single front steering wheel 15.

The rear drive wheels 13 are mounted on drive axles 18 extending laterally from opposite sides of the casting 11. Short lateral shafts 16, to which the rear drive wheel axles 18 are connected by universal joints 20, are supported in bearings 21 provided in suitable openings in the rear casting 11. A pair of brackets 22 are secured on each side of casting 11 by U-bolts 23 in spaced relation to the adjacent shaft 16. A split bushing 24 is mounted in a bearing recess 25 in each bracket 22 and in a complemental recess formed by the curved inner portion of the U-bolt 23. Each axle 18 is housed in a housing 27 extending laterally from the tractor body and pivotally connected thereto by means of horizontal trunnions 26 formed at the inner end of housing 27. A bearing 29 carried at the outer end of each housing 27 provides support for the outer ends of the axles 18, the inner ends being supported through their connections with shafts 16. The universal joints are disposed concentrically with the axes of trunnions 26 of the housings 27, respectively, whereby vertical angular movement of each housing and associated axle occurs on a common axis. Diagonally disposed adjustable braces 30 are pivotally connected to the casting 11 and the housings 27 at 31 and 32, respectively, and serve to strengthen the connection established through the trunnions 26. Point 31 is in alignment with the axes of trunnions 26 to permit the angular movement of the housings as described.

The weight of the tractor body is transmitted to the rear wheels through a transverse beam 33 bolted to the casting 11 by bolts 35. Upwardly directed arms 34 are provided on the ends of beam 33. Each arm has a recess 38 on its lower side in which the upper end of a spring 36 is seated. The lower end of each spring is disposed in a depression 37 formed on housing 27. Arms 33 are directed upwardly to furnish ample clearance for relative angular movement of the housings 27. Escape of grease and admission of dirt between cooperating surfaces of the housing 27 and the brackets 22 is prevented by a lubricant-tight flexible sleeve 40 held in place by securing collars 41 and 42.

The front steering wheel 15 is connected to the tractor body by means of a sleeve 43 which is attached to the casting 10 by parallel links 45 and 46. Wheel 15 is journaled between the ends of a fork 44 having a vertical spindle journaled in sleeve 43. A spring 47 is disposed between a ledge 48 on the casting 10 adjacent the uppermost link 45 and a ledge 49 on the sleeve 43 adjacent lower link 46, to cushion swinging movement of the casting 10 relative to the sleeve 43. Front wheel 15 is connected through steering mechanism 50 to a hand wheel 51 for steering purposes.

Power for driving the tractor is furnished by a motor 52 mounted on front casting 10. Transmission of power from the motor 52 to the shafts 16 is obtained by suitable gearing enclosed in rear casting 11 and a differential of which worm wheel 53 is a part. Bevel gears 54 and 55 mounted on shafts 16 are driven by worm wheel 53 through intermeshed bevel gears in the well known manner. Universal joints 20 complete the driving connection to the axles 18 which support the drive wheels 13.

Means for locking the springs 36 in inoperative condition, which forms an important part of this invention, includes a pair of bolts 56. Bolts 56 are pivotally anchored to lugs 57, one being provided on each housing 27 at 58. The free ends of bolts 56 are threaded and loosely disposed in openings 59 in the arms 34 so as to slide relative thereto in accordance with the relative movement of the housings 27 and the arms 34. A nut 60 applied on the threaded end of each bolt 56 intermediate the associated housing and the under side of arm 34 limits relative approach of the housing and the arm 34. A second nut 61 on the end of each bolt 56 coacts with the opposite side of arm 34 to limit relative departure of the arm and the axle housing. Hence, when the arms 34 are firmly locked between nuts 60 and 61, no relative approach or departure of the arms 34 and axle housings 27 is permitted. In this condition the springs 36 are totally disabled and the rear portion of the tractor body is rigidly supported on the rear wheels.

Means for locking spring 47 in inoperative condition comprises a bolt 63 pivoted to sleeve 43 at 64. As shown in Fig. 6, a slot 62 in the outer end of casting 10 is adapted to receive the threaded end of bolt 63. When bolt 63 is disposed in slot 62, nuts 65 and 66 applied on the threaded end of bolt 63 may be adjusted relative to the casting 10 in the same manner as nuts 60 and 61 relative to arms 34, as shown in Fig. 6. Thus the spring mounting associated with front wheel 15 may be controlled or disabled independent of the adjustment of the rear axle mountings. A clip 68 on the sleeve 43 is recessed at 67 to receive the nut 66. By screwing down the nut 66 thereon the bolt 63 may be supported in inoperative position as shown in Fig. 1, The wheels 13 are slidably mounted on the axles 18, which are splined for this purpose, to provide for adjustment of the rear wheel tread according to the width between plant rows. Suitable locking mechanism may be provided to lock the wheels in any position of adjustment, such as sleeve 69, split at 70 and secured by bolts 71 to the hub portion of each wheel 13, shown in Fig. 4. With my improved locking means, housings 27 may not only be locked to dispose the axles in a horizontal position as shown in Fig. 2, but the housings may also be locked to dispose the axles in either a downwardly inclined or an upwardly inclined position. When the axles 18 are locked in upwardly inclined positions the wheels 13, when released for tread adjustment, will be urged to slide inwardly on the axles 18 with forward travel of the tractor. When the axles 18 are locked in downwardly inclined positions, the wheels 13, when released for tread adjustment, will tend to slide outwardly with advance movement of the tractor. Thus, my invention also provides for facilitating the adjustment of the lateral position of the wheels 13, because of the fact that the axles can be locked in an upwardly or downwardly inclined position.

The wheels 13, when cambered inwardly, will increase the clearance between the body of the tractor and the ground. When cambered outwardly, this clearance is reduced while the center of gravity of the tractor body is lowered. Accordingly, the height of the tractor may be controlled to fit specific requirements as to ground clearance or stability by altering the angularity of the wheels relative to the ground. For example, proper operation of cultivating equipment requires more clearance and less attention to the position of the center of gravity than other implements, such as plows.

I claim:

1. The combination with a tractor comprising a body, driving mechanism, a wheel supported axle driven thereby and jointed for rising and falling movement about axes spaced laterally from the medial line of the tractor, springs adapted to yieldably support said body on said axle, and spring disabling means for adjustably fixing said body and axle in variable angular relation.

2. The combination with a tractor comprising a frame, driving mechanism mounted on said frame, a wheel supported axle driven thereby and jointed for rising and falling movement about axes spaced laterally from the medial line of the tractor, springs adapted to yieldably support said body on said axle, and means associated with each axle section for locking said axle section in variable positions independent of the position of the other axle section.

3. The combination with a tractor comprising a frame, driving mechanism mounted on said frame, a wheel supported axle driven thereby and jointed for rising and falling movement about axes spaced laterally from the medial line of the tractor, springs adapted to yieldably support said body on said axle, and spring disabling means associated with each axle section for locking said axle section in variable positions independent of the position of the other axle section.

4. The combination with a tractor comprising a frame, a steerable road wheel assembly, linkage connecting said assembly and the front of said frame for vertical swinging movement, a spring for cushioning said vertical swinging movement, spring disabling means for locking said linkage in non-swinging adjustment, a transverse beam fixed to the rear of said frame, driving mechanism on said frame, a pair of wheel supported axles driven thereby and independently mounted on said frame for vertical swinging movement relative thereto, housings for said axles mounted on said frame for vertical swinging movement about axes common to swinging movement of said axles, springs between said housings and corresponding portions of said beam for cushioning swinging movement of said housings relative to said beam, bolts pivotally anchored on said housings, there being openings in said beam through which the threaded ends of said bolts are loosely disposed, a nut on each bolt intermediate said beam and an associated housing to limit relative approach of said housing and beam, and a second nut on each bolt coacting with the opposite side of said beam to limit relative departure of the beam and the associated axle housing.

5. The combination with a tractor body, supporting wheels, means for mounting said wheels on said body whereby said wheels are adjustable laterally with respect to the median line of the tractor body and angularly with respect to the ground, springs operatively disposed between said body and said wheels, and spring disabling means for rigidly fixing the position of said body relative to said wheels.

6. A tractor comprising a body, a pair of axles extending laterally from opposite sides of the body, a supporting wheel disposed on each axle and adjustable longitudinally thereof whereby the distance between said wheels may be adjusted, springs operatively disposed between said body and said axles, and spring disabling means for fixing said axles in an upwardly and in a downwardly inclined position at will whereby the adjustment of the wheels on the axles may be facilitated.

7. The combination with a tractor comprising a frame, a transverse beam fixed to the rear of said frame, driving mechanism on said frame, a pair of wheel supported axles driven thereby and independently mounted on said frame for vertical swinging movement relative thereto, housings for said axles mounted on said frame for vertical swinging movement about axes common to swinging movement of said axles, springs between said housings and corresponding portions of said beam for cushioning swinging movement of said housings relative to said beam, bolts pivotally anchored on said housings, there being openings in said beam through which the threaded ends of said bolts are loosely disposed, a nut on each bolt intermediate said beam and an associated housing to limit relative approach of said housing and beam, and a second nut on each bolt coacting with the opposite side of said beam to limit relative departure of the beam and the associated axle housing.

THEOPHILUS BROWN.